(12) United States Patent
Moskal

(10) Patent No.: US 9,804,279 B2
(45) Date of Patent: Oct. 31, 2017

(54) METHOD FOR DETERMINING PARAMETERS OF A REACTION OF A GAMMA QUANTUM WITHIN A SCINTILLATOR OF A PET SCANNER

(71) Applicant: UNIWERSYTET JAGIELLONSKI, Cracow (PL)

(72) Inventor: Pawel Moskal, Czulowek (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 0 days.

(21) Appl. No.: 14/915,264

(22) PCT Filed: Aug. 29, 2014

(86) PCT No.: PCT/EP2014/068378
§ 371 (c)(1),
(2) Date: Feb. 29, 2016

(87) PCT Pub. No.: WO2015/028608
PCT Pub. Date: Mar. 5, 2015

(65) Prior Publication Data
US 2016/0216386 A1    Jul. 28, 2016

(30) Foreign Application Priority Data
Aug. 30, 2013  (PL) .......................................... 405187

(51) Int. Cl.
*G01T 1/20*    (2006.01)
*G01T 1/29*    (2006.01)

(52) U.S. Cl.
CPC .......... *G01T 1/2985* (2013.01); *G01T 1/2018* (2013.01)

(58) Field of Classification Search
None
See application file for complete search history.

(56) References Cited

U.S. PATENT DOCUMENTS 4,864,140 A * 9/1989 Rogers .................. G01T 1/2985
250/363.03

* cited by examiner

*Primary Examiner* — Edwin Gunberg
(74) *Attorney, Agent, or Firm* — Mark M. Friedman

(57) ABSTRACT

A method for determining parameters of a reaction of a gamma quantum within a scintillator of a PET scanner, comprising transforming a signal measured in the scintillator using at least one converter into an electric measurement signal, wherein the method comprises the steps of: obtaining access to a reference parameters memory (10) comprising reference signals represented in a time-voltage (Wt-v) coordinate system and in a time-amplitude fraction (Wt-f) coordinate system and having associated reaction parameters; sampling the electric measurement signal (S) measured in the time-voltage (PT-V) coordinate system and in the time-amplitude fraction (Pt-f) coordinate system; comparing results of the sampling (PT-V, PM) of the electric measurement signal (S) with the reference signals (Wt-V, Wt-f) and selecting reference shape parameters so that the reference (W) is best fitted to the results of the sampling (PT-V, PM) of the electric measurement signal (S); and determining the parameters of the reaction of the gamma quantum within the scintillator (1) for the electric measurement signal (S) based on pre-calibrated functions that determine the values of parameters of signal shape depending on the parameters of the reaction of gamma quantum within the scintillator.

3 Claims, 5 Drawing Sheets

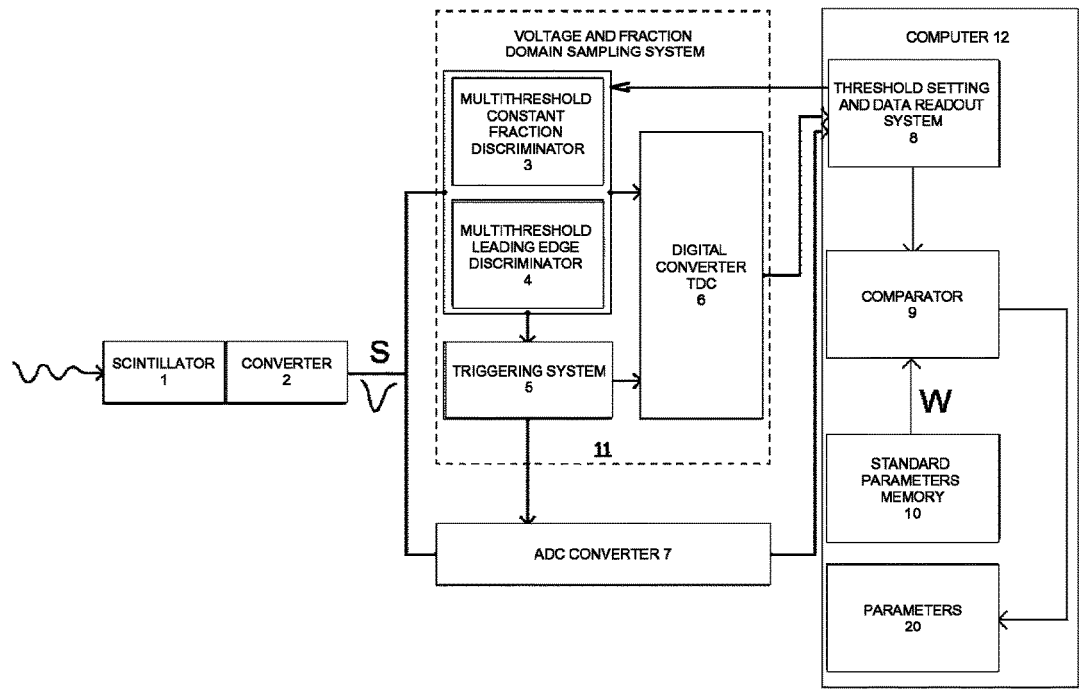
Fig. 1
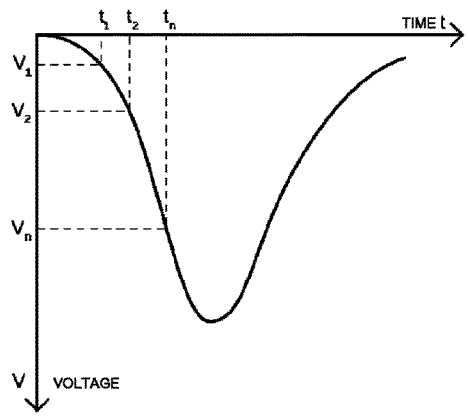 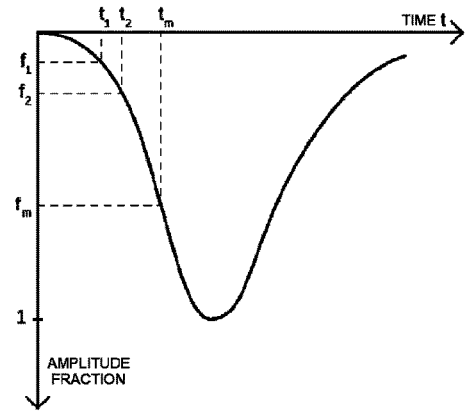
Fig. 2A    Fig. 2B

METHOD FOR DETERMINING PARAMETERS OF A REACTION OF A GAMMA QUANTUM WITHIN A SCINTILLATOR OF A PET SCANNER

TECHNICAL FIELD

The present disclosure relates to a method for determining parameters of a reaction of a gamma quantum within a scintillator of a PET scanner.

BACKGROUND

Images of the interiors of bodies may be acquired using various types of tomographic techniques, which involve recording and measuring radiation from tissues and processing acquired data into images.

One of these tomographic techniques is positron emission tomography (PET), which involves determining spatial distribution of a selected substance throughout the body and facilitates detection of changes in the concentration of that substance over time, thus allowing to determine the metabolic rates in tissue cells.

The selected substance is a radiopharmaceutical administered to the examined object (e.g. a patient) before the PET scan. The radiopharmaceutical, also referred to as an isotopic tracer, is a chemical substance having at least one atom replaced by a radioactive isotope, e.g. $^{11}C$, $^{15}O$, $^{13}N$, $^{18}F$, selected so that it undergoes radioactive decay including the emission of a positron (antielectron). The positron is emitted from the atom nucleus and penetrates into the object's tissue, where it is annihilated in reaction with an electron present within the object's body.

The phenomenon of positron and electron annihilation, constituting the principle of PET imaging, consists in converting the masses of both particles into energy emitted as annihilation photons, each having the energy of 511 keV. A single annihilation event usually leads to formation of two photons that diverge in opposite directions at the angle of 180° in accordance with the law of conservation of the momentum within the electron-positron pair's rest frame, with the straight line of photon emission being referred to as the line of response (LOR). The stream of photons generated in the above process is referred to as gamma radiation and each photon is referred to as gamma quantum to highlight the nuclear origin of this radiation. The gamma quanta are capable of penetrating matter, including tissues of living organisms, facilitating their detection at certain distance from object's body. The process of annihilation of the positron-electron pair usually occurs at a distance of several millimeters from the place of the radioactive decay of the isotopic tracer. This distance constitutes a natural limitation of the spatial resolution of PET images to a few millimeters.

A PET scanner comprises detection devices used to detect gamma radiation as well as electronic hardware and software allowing to determine the position of the positron-electron pair annihilation event on the basis of the position and time of detection of a particular pair of the gamma quanta. The radiation detectors are usually arranged in layers forming a ring around object's body and are mainly made of an inorganic scintillation material. A gamma quantum enters the scintillator, which absorbs its energy to re-emit it in the form of light (a stream of photons). The mechanism of gamma quantum energy absorption within the scintillator may be of dual nature, occurring either by means of the Compton's effect or by means of the photoelectric phenomenon, with only the photoelectric phenomenon being taken into account in calculations carried out by current PET scanners. Thus, it is assumed that the number of photons generated in the scintillator material is proportional to the energy of gamma quanta deposited within the scintillator.

When two annihilation gamma quanta are detected by a pair of detectors at a time interval not larger than several nanoseconds, i.e. in coincidence, the position of annihilation point along the line of response may be determined, i.e. along the line connecting the detector centers or the points within the scintillator strips where the energy of the gamma quanta was deposited. The coordinates of annihilation place are obtained from the difference in times of arrival of two gamma quanta to the detectors located at both ends of the LOR. In the prior art literature, this technique is referred to as the time of flight (TOF) technique and the PET scanners utilizing time measurements are referred to as TOF-PET scanners. This technique requires that the scintillator has time resolution of a few hundred picoseconds.

Light pulses reaching the scintillator can be converted into electric pulses by means of photomultipliers or photodiodes. Electric signals from the converters carry information on positions and times of the annihilation quanta subject to detection, as well as on the energy deposited by these quanta.

The principal elements of the signal processing system within the radiation detectors are leading edge discriminators and constant fraction discriminators. These elements, combined with time-to-digital converters, facilitate the measurement of time at which the electric signals generated at these detectors exceed a preset reference voltage or a preset signal amplitude fraction, respectively. Said discriminators are built on the basis of standard electronic components and include, among other components, a current source, a pre-amplifier, a comparator, a shaper, capacitors, resistors, diodes, transistors and transmission lines. If the detector signal is higher than the threshold voltage set at the discriminator, a logical signal is generated at the discriminator output, carrying information on the time at which the gamma quantum was recorded. The charge is measured by means of analog-to-digital converters.

Temporal resolutions of leading edge and constant fraction discriminators are limited by the dependence of the discriminator response on the shape of signals and, in case of leading edge discriminators, also on the amplitude of input signals. Due to the so-called time walk effect, time determined using leading edge discriminators changes along with the signal amplitude. The effect may be adjusted to a certain degree if the signal charge or amplitude is measured simultaneously. In case of constant fraction discriminators, the time at which the signal exceeds the preset amplitude fraction is generally not dependent on the amplitude, but it may change depending on the shape of the signal (i.e on the temporal distribution of photons).

Logical signals generated at discriminators are processed by means of sequences of logical operations within a triggering system. These operations result in a logical signal providing information on whether the recorded event should be subjected to further electronic processing. The sequences of logical operations are selected depending on the types of detectors, configuration of modules and the frequencies of recorded events; the main objective of these operations is to discard signals that are not useful for image reconstruction and thus to minimize acquisition dead times as well as times required to process the data and reconstruct the images.

The PCT applications WO2011/008119 and WO2011/008118 describe various aspects of PET scanners that may be of relevance for understanding this description, in particular, a method for determining the place of ionization on the basis of the distribution of times or amplitudes of signals measured at different positions along the scintillator. These documents describe solutions that are based on the measurements of the times of flight required for light pulses to reach detector edges. Changes in shapes and amplitudes of signals depending on the place of ionization and the quantity of energy constitute a constraint in temporal resolutions that can be achieved using the technique. The larger the scintillator, the larger the variations in signal shapes and amplitudes. For the above reasons, temporal resolutions of less than 100 ps cannot be obtained for large scintillator blocks according to the prior art. Temporal resolution also impacts the resolution of ionization place determination. In case of polymer scintillators (preferred due to their low price), amplitudes of signals generated by the gamma quanta, including annihilation gamma quanta used in positron emission tomography, are characterized by continuous distribution resulting from interactions between gamma quanta and electrons occurring mostly via the Compton effect with a negligibly low probability of a photoelectric effect. As a consequence, signal amplitudes in polymer scintillators may change even if the signals originated in the same position. In case of Compton interactions, constraints in the achieved resolution are due to the fact that the amplitude of electric signals generated by the photomultipliers depends on two unknown values, namely on distance between the ionization place and the photomultiplier and on energy deposited by the gamma quantum. The effects described above contribute to deterioration in both temporal and spatial resolution also in case of monoenergetic energy-loss distributions, which occur e.g. in the photoelectric effect.

As evidenced by the shortcomings of the state of the art signal analysis techniques described above, there is a need to significantly improve temporal and spatial resolution of detectors being used in medical diagnostic techniques that require the recording of ionizing radiation. The need to improve resolution is particularly high in large-sized detectors.

One of the developed improvement methods is continuous sampling of analog signals in temporal domain. Continuous sampling known from the state of the art is associated with operation of an ADC converter which collects a specific number of analog signal samples at predefined time intervals. However, the method is not capable of improving results in case of rapid signals from polymer scintillators, characterized by decay and rise times on the order of 1 ns. Sampling frequencies that may be practically applied in devices featuring a large number of detectors are on the order of 100 MHz (Flash ADC). This sampling frequency corresponds to sampling intervals of 10 ns, which are comparable to the duration of the signal itself. Therefore, even if the sampling frequencies were higher by an order of magnitude, they would still be insufficient for analyzing signals from polymer scintillators.

It would be desirable to develop a detector and a method for determining the position and time of ionization in polymer scintillators.

SUMMARY

There is presented a method for determining parameters of a reaction of a gamma quantum within a scintillator of a PET scanner, comprising transforming a signal measured in the scintillator using at least one converter into an electric measurement signal, wherein the method comprises the steps of: obtaining access to a reference parameters memory comprising reference signals represented in a time-voltage ($W_{t-v}$) coordinate system and in a time-amplitude fraction ($W_{t-f}$) coordinate system and having associated reaction parameters; sampling the electric measurement signal (S) measured in the time-voltage ($P_{t-v}$) coordinate system and in the time-amplitude fraction ($P_{t-f}$) coordinate system; comparing results of the sampling ($P_{t-v}$, $P_{t-f}$) of the electric measurement signal (S) with the reference signals ($W_{t-v}$, $W_{t-f}$) and selecting reference shape parameters so that the reference (W) is best fitted to the results of the sampling ($P_{t-v}$, $P_{t-f}$) of the electric measurement signal (S); and determining the parameters of the reaction of the gamma quantum within the scintillator for the electric measurement signal (S) based on pre-calibrated functions that determine the values of parameters of signal shape depending on the parameters of the reaction of gamma quantum within the scintillator.

Preferably, sampling in the time-voltage coordinate system and in the time-amplitude fraction coordinate system is performed by means of a multithreshold leading edge discriminator and a multithreshold constant fraction discriminator.

Preferably, the parameters of the reaction of the gamma quantum include energy deposited within the scintillator as well as position and time of the reaction.

Preferably, the fit quality is determined from the minimum chi-square value ($\chi^2$ min).

There is also presented a system for determining parameters of a reaction of a gamma quantum within a scintillator of a PET scanner wherein the signal measured in the scintillator is transformed using at least one converter into an electric measurement signal (S), the system comprising a reference parameters memory comprising reference signals in a time-voltage ($W_{t-v}$) coordinate system and in a time-amplitude fraction ($W_{t-f}$) coordinate system along with reaction parameters assigned to the reference signals; a multithreshold leading edge discriminator configured to sample the electric measurement signal (S) in the time-voltage ($P_{t-v}$) coordinate system; a multithreshold constant fraction discriminator designed to sample the electric measurement signal (S) in the time-fraction ($P_{t-f}$) coordinate system; a comparator configured to compare the results of the sampling ($P_{t-v}$, $P_{t-f}$) of the electric signal (S) with the reference signals ($W_{t-v}$, $W_{t-f}$) and to select the parameters determining the shape of the reference (W) that are best fitted to the results of the sampling ($P_{t-v}$, $P_{t-f}$) of the electric signal (S) and to determine the parameters of the reaction of the gamma quantum within the scintillator from pre-calibrated functions that determine the values of parameters of signal shape depending on the parameters of the reaction of the gamma quantum within the scintillator.

The presented method is distinguished by the fact that a signal from a single photomultiplier is sufficient for determination of the parameters and in that it allows to achieve temporal and spatial resolutions better than those of the solutions known from the state of the art when a higher number of photomultipliers is used. In general, the presented method also allows to determine the time of interaction, the distance between the place of interaction and the converter as well as the energy deposited by the gamma quanta within large-size polymer detectors even when a single photomultiplier is used, which has not been attainable in solutions known in the art.

BRIEF DESCRIPTION OF FIGURES

Example embodiments are presented on a drawing wherein:

FIG. 1 presents the outline of an example detection system;

FIGS. 2A and 2B present the sampling in voltage and amplitude fraction domains;

DETAILED DESCRIPTION

Figure 3A:
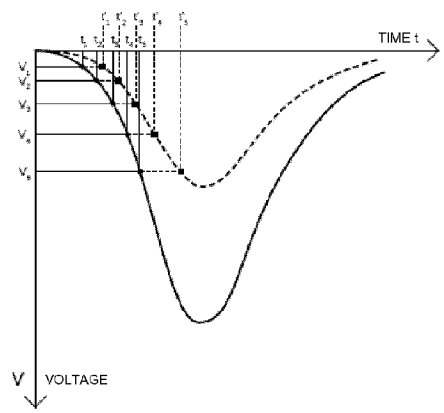
FIG. 3A-3D compare the effects of sampling in voltage and amplitude fraction domains.

FIG. 1 presents the outline of the detection system. The system comprises scintillator 1 and converter 2 that converts the light signals from the scintillator into electric signals S. The electric signals S are delivered to multifractional constant fraction discriminator 3 and a multithreshold leading edge discriminator 4. Discrimination of signals is carried out with respect to a triggering signal generated by the triggering system 5. In addition, the system consists of a TDC converter 6, an ADC converter 7 and a computer 12 comprising a threshold setting and data readout system 8 used to define thresholds at discriminators 3, 4 and to read the data delivered from the TDC converter 6 and the ADC converter 7. In addition, computer 12 comprises a comparator 9 that collects and compares information from the threshold setting and data readout system 8 and the reference parameters memory 10, allowing to determine the similarity of data and thus to obtain the parameters 20. The entire process is described in more detail below.

FIG. 2A presents the sampling of the signal in the voltage domain using a multithreshold (n-threshold) leading edge discriminator 4, while FIG. 2B presents the sampling of the signal in the amplitude fraction domain using a multifractional (m-fractional) constant-fraction discriminator 3. Simultaneous sampling of the signal in both domains facilitates precise determination of the position and the time of the interaction between the gamma quantum and the scintillator strip as well as determination of the energy deposited by the gamma quantum within the scintillator. The reconstruction method transforms the defect consisting in a variation in signal shape and amplitude dependent on the distance between the place of ionization and the photomultiplier (cf. FIG. 4) to an advantage facilitating reconstruction of said place on the basis of said variation. The method for reconstructing the ionization place was developed on the basis of the following findings:

(a) the shape of the light signal (number of photons as a function of time) at the ionization place does not depend on the place of reaction of the gamma quantum;
(b) the signal amplitude increases monotonously with the energy deposited by the gamma quantum;
(c) the shape of the light pulse reaching the photomultiplier depends on the distance between the ionization place and the photomultiplier;
(d) the image of the signal sampled within the amplitude fraction domain does not depend on the shape of that signal;
(e) the image of the signal sampled within the voltage domain depends on both the amplitude and the shape of the signal (FIG. 3).

Characteristics (a) and (b) are commonly known and require no explanation.

Characteristic (c) is derived from observation that photons diverge at different angles from the place of pulse generation and therefore the distances (and thus times) traveled by individual photons from the ionization place to the photomultiplier depend on the angle of photon emission.

Characteristics (d) and (e) were concluded from the fact that the output of the leading edge discriminator preset with the reference voltage of $V_0$ is time "t" being the solution of the equation $V(t)=V_0$, where $V(t)$ is the voltage vs. time relationship (signal shape—solid line in FIG. 2). At the same time, a constant-fraction discriminator provides a value of variable "t" that "solves" the equation $V(t)=f \cdot A$ where A is the signal amplitude and f is the fraction set at the discriminator. For a particular pulse shape, e.g. g(t), the function of amplitude may be expressed as: $V(t)=A \cdot g(t)$. This means that given a particular signal shape and a preset fraction f, the constant fraction discriminator operating on signal V(t) should give the value of time t that provides the solution for equation $g(t)=f$ that depends only on the preset fraction f and not on the signal amplitude A. This has been visually illustrated on the right side of FIG. 3.

Figure 3B:
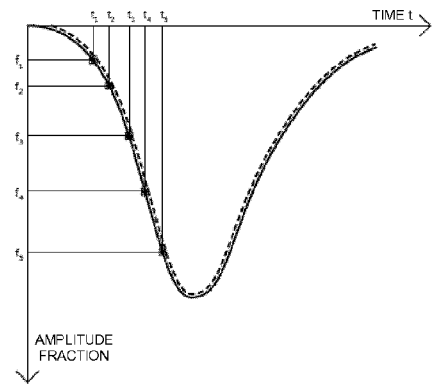
Figure 3C:
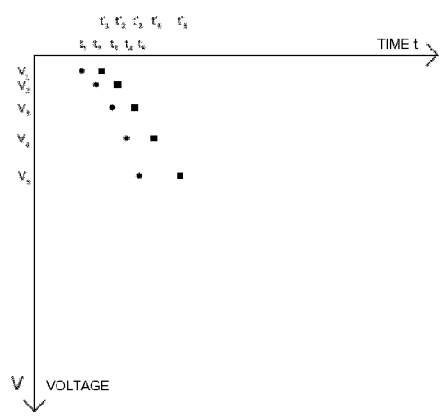
Figure 3D:
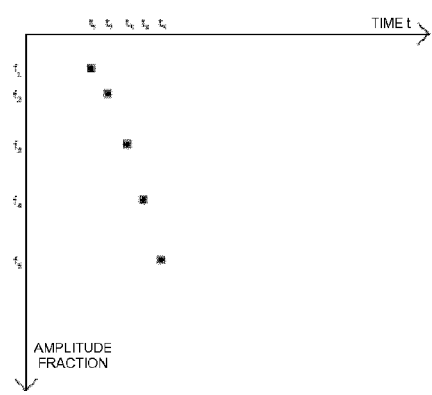

FIGS. 3A-3D present a scheme that illustrates qualitative differences between discretization of signals within the voltage-time space as shown in FIGS. 3A and 3C and within the amplitude fraction-time space as shown in FIGS. 3B and 3D. An example of sampling of signals of the same shape but amplitude differing by a factor of 2 is presented. The graph illustrates the fact that the trace of the signal discretized in the amplitude fraction domain does not depend on the amplitude itself. At the same time, the shape of the signal discretized within the voltage domain depends on the amplitude.

The signal discretized using an n-threshold leading edge discriminator consist of a set of points $(V_i, t_i)$ where $i=1, 2 \ldots, n$—this signal corresponds to results of sampling within the $P_{t-v}$ representation system. Discretization using an m-fraction constant fraction discriminator provides a set of points $(f_j, t_j)$ where $j=1, 2 \ldots, m$, wherein this set corresponds to results of sampling within the $P_{t-f}$ representation system. The change in the shape may be measured for example by deviation from a predefined reference W. The reference W may consist in the shape of the signal generated by an infinitesimally small scintillator and expressed within the time-voltage representation system (referred to as reference $W_{t-v}$) and the time-amplitude fraction representation system ($W_{t-f}$); in general, however, the reference may be of any shape, for example that of a straight line approximating the shape of the rising edge:

$$V_{std}(t)=a_{sp\_std} \cdot t+b_{sp}$$

and $$f_{std}(t)=a_{sf\_std} \cdot t+b_{sf}$$

In the above example of a straight line, the shape V(t) is given by a linear function with slope a and intercept b. The reference slope in fraction vs. time representation system may differ from this in the voltage vs. time representation system. The shape is determined by slope a.

The consistency of the signal with the reference is measured by the minimum chi-square value ($\chi^2_{min}$) obtained from the fitting of the reference shape to the discretized signal when b is the only variable parameter. Chi-square is the standard measure of consistency between the function being fitted and the results of the measurement, used for example in the least square fitting method.

Therefore, the distance between the ionization place x and the photomultiplier (FIG. 4) may be determined from discretization of the signal within the amplitude fraction domain from the relationship $\chi^2_{sf\_min}(x)$ obtained after previous calibration, for example using a collimated beam of annihilation quanta. Calibration consists in determination of the function $\chi^2_{sf\_min}(x)$; given a collimated beam, one may perform measurements for different x values and determine $\chi^2_{sf\_min}$ of the recorded signals for every x.

$\chi^2_{sp\_min}$ is the minimum value of function $$\chi^2_{sf}(a_{sf\_std}, b_{sf}) \equiv \Sigma(t_{j\_fit}(a_{sf\_std}, b_{sf}) - t_j)^2$$

with $b_{sf}$ as the free fit parameter. In the above definition, $t_j$ stands for the signal time measured for the j-th amplitude fraction and $t_{j\_fit}(a_{sf\_std}, b_{sf})$ stands for the time of the j-th amplitude fraction calculated from the fitted curve $f_{std}(t)$. The place of ionization x may also be determined from the relationship $a_{sf}(x)$ obtained from previous calibration. In this case, the $f_{fit}(t) = a_{sf} \cdot t + b_{sf}$ function is being fit with both $a_{sf}$ and $b_{sf}$ as free parameters.

Next, following determination of the ionization place, the signal amplitude is determined on the basis of the signal discretized within the voltage domain from the relationship $a_{sp}(A,x)$ or $\chi^2_{sp\_min}(A,x)$ obtained after previous calibration, for example using a collimated beam of annihilation quanta. $\chi^2_{sp\_min}$ is the minimum value of function $$\chi^2_{sp}(a_{sp\_std}, b_{sp}) \equiv \Sigma(t_{j\_fit}(a_{sp\_std}, b_{sp}) - t_j)^2$$

with both $a_{sp}$ and $b_{sp}$ as free parameters. The signal amplitude may also be determined as the highest reference voltage at which a logical pulse has been generated by the discriminator.

With the knowledge of the signal amplitude and the distance between the ionization place and the photomultiplier, the energy deposited within the scintillator is determined from previously prepared calibration curves. To this end, one should establish independent calibration references $E(x,A)$—for each position x, the relationship $E(A)$, where $E$ is the deposited energy and $A$ is the signal amplitude, should be determined.

Next, the photomultiplier signal onset time ($t_0$) can be determined from functions $V_{fit}(t)$ and $f_{fit}(t)$, for instance as a weighted average with weights consisting of the uncertainties of fitting, using the following equations: $V_{fit}(t_0)=0$ and $f_{fit}(t_0)=0$.

The photomultiplier signal onset time can be determined after parameters of functions $V_{fit}(t)$ and $f_{fit}(t)$ are established. The functions are fitted to the measurement results. In the example embodiment described herein, the function is a straight line approximated to the rising edge of signal, but it may also be another function that would better reflect the shape of the signal onset. Regardless of the shape of the function, the effective signal onset may be calculated, for example as a solution of the equation $V_{fit}(t)=0$. Thus, in case of a straight line, solution of the equation would involve identification of a parameter t at which the line intercepts the x axis.

Preferably, the shapes of the fitting functions $V_{fit}(t,x)$ and $f_{fit}(t,x)$ are independently tabulated for every detection module after being calibrated using appropriate radiation type, for example annihilation radiation in case of detectors used in positron emission tomography. Preferably, the light signal from the scintillator is converted into an electric impulse in more than one place.

Figure 4:
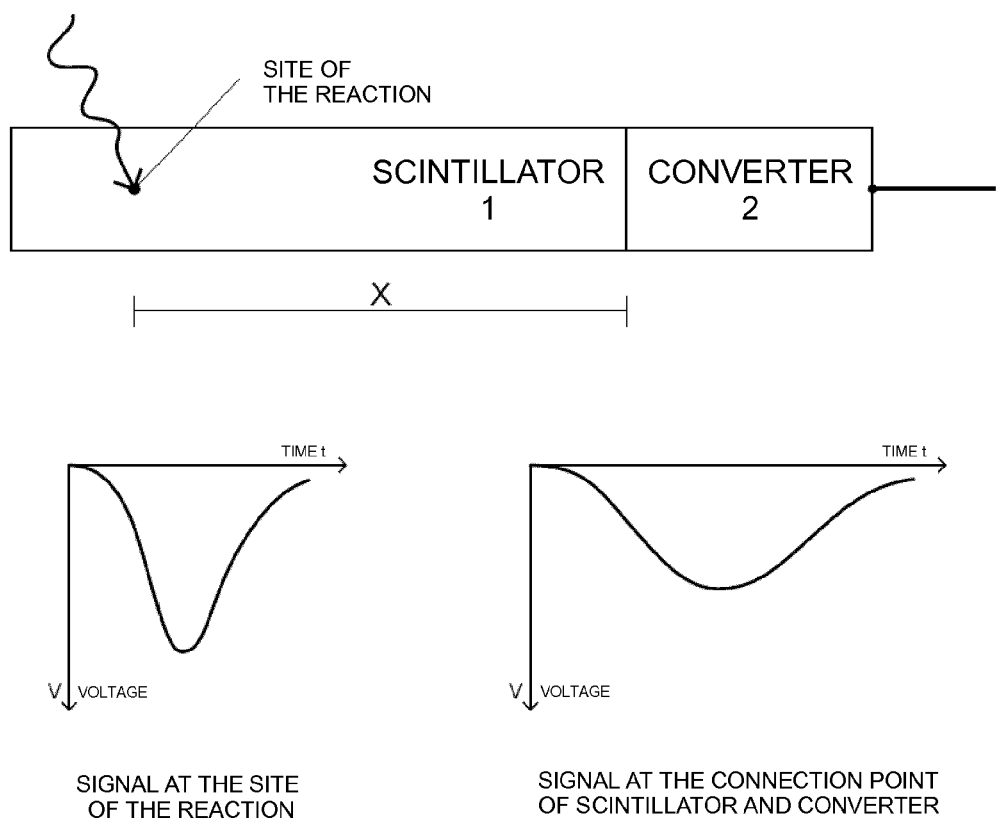
FIG. 4 presents the effect of the distance between the place of the reaction and the converter on the signal profile.

FIG. 4 presents changes in the shapes of light pulses resulting from propagation of the pulse from the reaction place to the converter.

Figure 5:
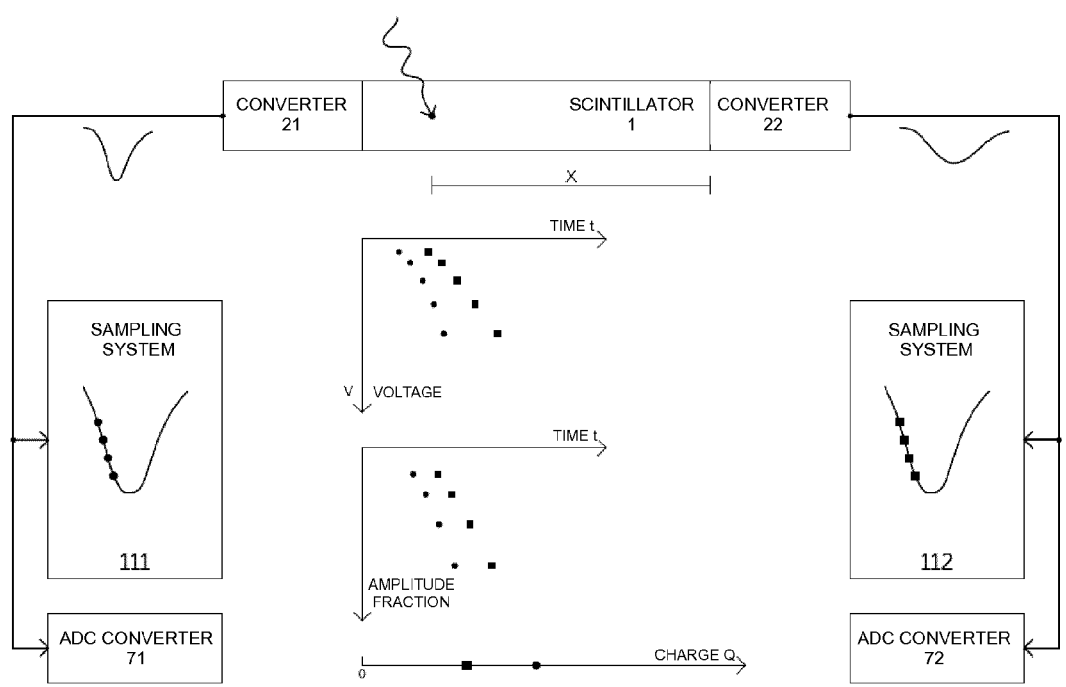
FIG. 5 presents an example strip detector.

FIG. 5 presents an example of a strip detector with an electronic readout system that facilitates signal sampling in voltage and amplitude fraction domains as well as determining signal charges. The chart presents a schematic discretization of signals for four voltage thresholds and four amplitude fractions. Signals measured at the right end are marked as squares while signals measured at the left end are marked as circles. Based on the method disclosed herein, sampling in the voltage and amplitude fraction domains facilitates determination of the place and the time of the reaction of the gamma quantum as well as of the energy deposited within scintillator 1 on the basis of the signal from the left photomultiplier 21 and independently on the basis of the signal from the right photomultiplier 22. Signals from converters 21, 22 are sent to two sampling systems 111, 112 and to respective ADC converters 71, 72 (as shown in FIG. 1). The sampling systems 111, 112 generate points presented in the graphs. The ADC converters 71, 72 are used to measure the charge of signals from the converters. Determination of the place of the reaction of a gamma quantum may also be made on the basis of the difference in times being determined on the left and on the right side of the strip and application of the procedure disclosed in a PCT application WO2011/008119, with photomultiplier signal onset time being determined using the above-described method of the disclosed solution. The use of two converters 21, 22 on the opposite sides of the strip 1 significantly enhances the sensitivity of the method for determining the place of ionization as it permits the method being disclosed in this application to be used for determining the place of ionization in several independent manners, including:

(a) from the result of sampling within the amplitude fraction domain and application of the above-described method independently for the left photomultiplier 21 and the right photomultiplier 22.

(b) from the ratio of slope factors $a_{sp\_left}/a_{sp\_right}(x)$ (based on discretization in the voltage domain)

(b) from the ratio of slope factors $a_{sf\_left}/a_{sf\_right}(x)$ (based on discretization in the amplitude fraction domain)

Figure 6:
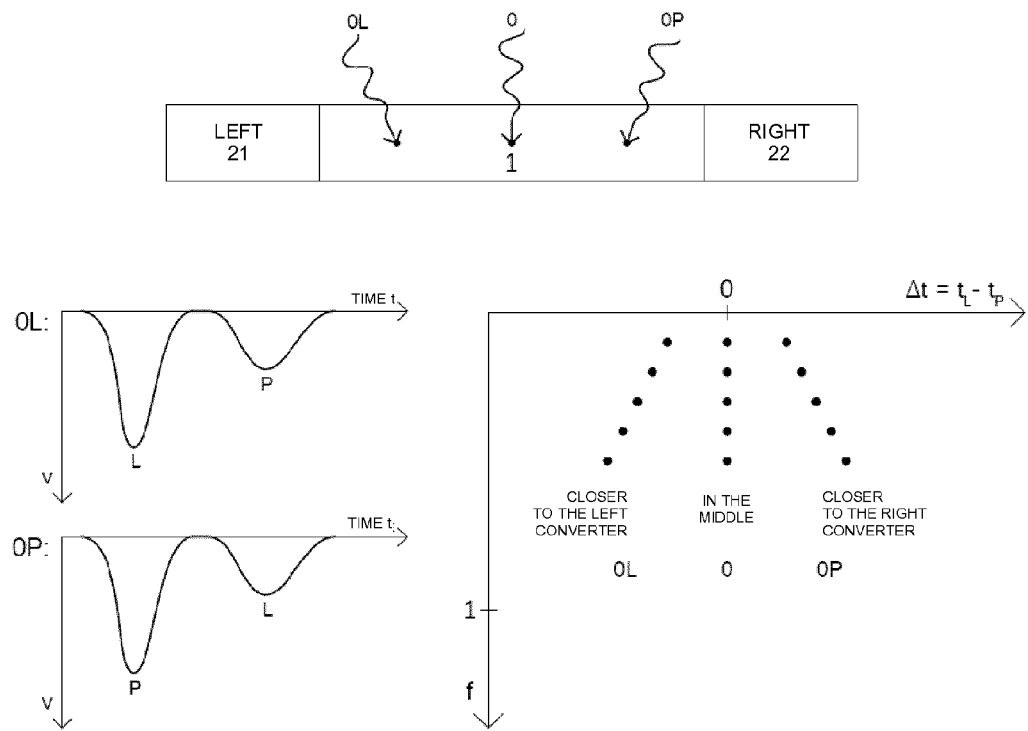
FIG. 6 presents example detector responses for three different places of reactions of a gamma quantum within the scintillator.

(d) from the relationship between the differences in the times of flight $\Delta t(f,x) \equiv t_L - t_R (f,x)$ and fraction f and the gamma quantum reaction place x (e) from the ratio of charges measured by ADC converters: $Q_L/Q_R (x)$ FIG. 6 presents examples of detector responses for three different places of the reaction of a gamma quantum within scintillator 1: closer to the left converter (0L), at the center (0), and closer to the right converter (0R). The right side of the figure presents schematic graphs of the time differences between the left and the right pulses ($\Delta t \equiv t_L - t_P$) depending on the amplitude fraction and place of the reaction of the gamma quantum for these three cases. As illustrated in FIG. 6, not only the absolute value of the difference between the times of signals from the left and the right converter ($\Delta t \equiv t_L - t_P$) as measured for a particular amplitude fraction or a reference voltage allows determination of the place of reaction of the gamma quantum, but also the shape of the function $f(\Delta t)$ as determined by multi-threshold constant-fraction discriminator changes depending on the place of the reaction of the gamma quantum x, thus facilitating independent determination of x.

While the technical solutions presented herein have been depicted, described, and defined with reference to particular preferred embodiment(s), such references and examples of implementation in the foregoing specification do not imply any limitation on the invention. Various modifications and changes may be made thereto without departing from the scope of the technical solutions presented. The presented embodiments are given as example only, and are not exhaustive of the scope of the technical solutions presented herein.

Accordingly, the scope of protection is not limited to the preferred embodiments described in the specification, but is only limited by the claims that follow.

The invention claimed is:

1. A method for determining parameters of a reaction of a gamma quantum within a scintillator of a Positron Emission Tomography (PET) scanner, comprising transforming a signal measured in the scintillator using at least one converter into an electric measurement signal, wherein the method comprises the steps of:
   obtaining access to a reference parameters memory comprising reference signals represented in a time-voltage ($W_{t-v}$) coordinate system and in a time-amplitude fraction ($W_{t-f}$) coordinate system and having associated reaction parameters;
   sampling the electric measurement signal (S) measured in the time-voltage ($P_{t-v}$) coordinate system by means of a multithreshold leading edge discriminator and sampling the electric measurement signal (S) measured in the time-amplitude fraction ($P_{t-f}$) coordinate system by means of multithreshold constant fraction discriminator;
   comparing results of the sampling of the electric measurement signal (S) measured in the time-voltage ($P_{t-v}$) coordinate system with the reference signals represented in the time-voltage ($W_{t-v}$) coordinate system;
   comparing results of the sampling of the electric measurement signal (S) measured in the time-amplitude fraction ($P_{t-f}$) coordinate system with the reference signals represented in the time-amplitude fraction ($W_{t-f}$) coordinate system;
   selecting reference shape parameters so that the reference (W) is best fitted to the results of the sampling of the electric measurement signal (S) in the time-voltage ($P_{t-v}$) coordinate system and in the time-amplitude fraction ($P_{t-f}$) coordinate system; and
   determining the parameters of the reaction of the gamma quantum within the scintillator for the electric measurement signal (S) based on pre-calibrated functions that determine the values of parameters of signal shape depending on the parameters of the reaction of gamma quantum within the scintillator;
   wherein the parameters of the reaction of the gamma quantum include energy deposited within the scintillator and a position and a time of the reaction.

2. The method according to claim 1 wherein the fit quality is determined from the minimum chi-square value ($\chi^2_{min}$).

3. A system for determining parameters of a reaction of a gamma quantum within a scintillator of a Positron Emission Tomography (PET) scanner wherein the signal measured in the scintillator is transformed using at least one converter into an electric measurement signal (S), the system comprising
   a reference parameters memory comprising reference signals in a time-voltage ($W_{t-v}$) coordinate system and in a time-amplitude fraction ($W_{t-f}$) coordinate system along with reaction parameters assigned to the reference signals;
   a multithreshold leading edge discriminator configured to sample the electric measurement signal (S) in the time-voltage ($P_{t-v}$) coordinate system;
   a multithreshold constant fraction discriminator designed to sample the electric measurement signal (S) in the time-amplitude fraction ($P_{t-f}$) coordinate system;
   a comparator configured to:
      compare the results of the sampling of the electric measurement signal (S) measured in the time-voltage ($P_{t-v}$), coordinate system with the reference signals represented in the time-voltage ($W_{t-v}$) coordinate system;
      compare the results of the sampling of the electric measurement signal (S) measured in the time-amplitude fraction ($P_{t-f}$) coordinate system with the reference signals represented in the time-amplitude fraction ($W_{t-f}$) coordinate system;
      select the parameters determining the shape of the reference (W) that are best fitted to the results of the sampling of the electric signal (S) in the time-voltage ($P_{t-v}$) coordinate system and in the time-amplitude fraction ($P_{t-f}$) coordinate system; and
      determine the parameters of the reaction of the gamma quantum within the scintillator from pre-calibrated functions that determine the values of parameters of signal shape depending on the parameters of the reaction of the gamma quantum within the scintillator, wherein the parameters of the reaction of the gamma quantum include energy deposited within the scintillator and a position and a time of the reaction.

\* \* \* \* \*